United States Patent [19]
Sheinbein

[11] 4,166,929
[45] Sep. 4, 1979

[54] INTEROFFICE CALLBACK ARRANGEMENT

[75] Inventor: Daniel Sheinbein, Elizabeth, N.J.

[73] Assignee: Bell Telephone Laboratories, Incorporated, Murray Hill, N.J.

[21] Appl. No.: 878,513

[22] Filed: Feb. 17, 1978

[51] Int. Cl.² .......................... H04M 3/48; H04Q 3/54
[52] U.S. Cl. ............................ 179/18 BG; 179/18 ES
[58] Field of Search ............. 179/18 BG, 18 B, 18 ES

[56] References Cited

U.S. PATENT DOCUMENTS

| | | | |
|---|---|---|---|
| 3,248,486 | 4/1966 | Wadsworth | 179/26 |
| 3,492,433 | 1/1970 | Duft et al. | 179/18 BG |
| 3,707,605 | 12/1972 | Lee, Jr. et al. | 179/18 BG |
| 3,854,014 | 12/1974 | Akin et al. | 179/18 BG |
| 4,068,101 | 1/1978 | Chemarin | 179/18 BG |

*Primary Examiner*—Thomas W. Brown
*Attorney, Agent, or Firm*—Frederick W. Padden

[57] ABSTRACT

A telephone switching system is disclosed with facilities for processing interoffice callback information over a common channel interoffice signaling system (4) between program controlled call processors (21, 34) in call originating and terminating offices (1, 2) upon encountering a called station busy condition. The terminating office call processor (34) is equipped to examine the busy-idle status of the called station (5) by consulting its supervisory memory (46) and by directed called station line scanning and then to enable an automatic call retry only after it is determined that the called station has become idle. Each of the call processors (21, 34) includes an originating register-callback register (47) for storing callback information comprising the calling and called station identities originating office identity, a callback code dialed from a calling station (3), a mark to specify the callback mode of register operation, a line recheck time delay and a time limit on the callback service. Automatic callback is effected in one arrangement by transferring the callback information from the originating to terminating office, ascertaining when the called station becomes idle, and then making a terminating-to-originating office call in an attempt to complete call connections between the calling and called stations. Another arrangement bypasses the terminating-to-originating office call and retransfers the callback information to the originating office for enabling it to initiate the call retry.

24 Claims, 2 Drawing Figures

FIG. 1

INTEROFFICE CALLBACK ARRANGEMENT

TECHNICAL FIELD

This invention relates to communication switching systems and particularly to equipment for automatically retrying customer dialed calls when they encounter busy conditions when first attempted.

BACKGROUND ART

Occasionally, telephone calls are not successfully completed because the called station is either busy or does not answer. Less frequently, calls are not completed because all available communication paths through the switching network are busy. Upon encountering either type of busy condition, a caller usually reoriginates and redials the called number in a retry attempt to complete the call.

Call retry service has long been an available telephone service to eliminate the undesired calling party effort during the persistence of a busy condition. In some switching systems, the service is manually provided by an operator at the calling party expense and on a recall basis as disclosed, for example, in P. W. Wadsworth U.S. Pat. No. 3,248,486 of Apr. 26, 1966.

Significant advances have been made in recent years to the extent that switching systems are now capable of automatically retrying interoffice calls without operator assistance whenever they cannot initially be completed due to either busy or no answer conditions. One such system is described in U.S. Pat. No. 3,492,433, D. M. Duft et al. issued Jan. 27, 1970. The patent discloses program controlled electronic facilities in a Traffic Service Position System for automatically retrying calls without operator assistance and at a time specified by the calling party.

In the foregoing call retry arrangements, a retried call often has not been successfully completed when reattempted because, for example, the called station remained busy or the calling station became busy in the interim. To provide more assurance that such a call retry is successful when attempted, the art has progressed in recent years to the point where automatic callback equipment is now commercially available for retrying intraoffice calls in such a manner that the called station is checked to determine that it is idle before any reattempt is made to complete call connections.

While such equipment is a valuable adjunct to switching systems, its utility has proven to be limited to serving intraoffice calls and especially those served, for example, within a single private branch exchange. A persistent problem in the art has been that no facilities have heretofore been available for providing automatic callback service between one or more switching offices in such a way that interoffice call retry attempts are initiated only after it has been ascertained that the called station has become idle. Obviously, such a problem is particularly aggravated for long distance calls involving many switching centers and miles of transmission facilities. The problem has also proven undesirable from a telephone company standpoint because it consumes valuable switching time and energy resources and, in many cases, without any revenue for the noncompletable interoffice calls. In addition, the calling parties are inconvenienced by being reengaged in the futile retry processing of interoffice calls.

DISCLOSURE OF THE INVENTION

The foregoing problem is solved and a technical advance is achieved with an automatic callback arrangement for use in a communication switching system to process interoffice callback information between first and second switching offices and to ascertain automatically that the called station is idle before an interoffice call is automatically retried.

When a call cannot currently be completed due to a busy condition, this callback arrangement is designed so that a first call processor in the call originating office is responsive to callback service request signals from a calling station to effect a transmission of automatic callback information to a second call processor in the call terminating office. All equipment in the originating office is then temporarily withdrawn from serving the call and all intelligence for automatic callback processing for the call resides in the facilities of the terminating office. An advantage of such a mode of operation is that the equipment of the originating office is not tied-up during the existence of a called station busy condition. Upon receipt of the callback information, the second call processor periodically controls an examination of the busy-idle status of the called station. When it is found to be idle, the second processor is selectively programmed to return automatic callback information to the first processor which, after checking that the calling station is idle, automatically retries the call from the originating to the terminating office. In another arrangement, when the called station is found to be idle, the second processor is programmed for immediately initiating a call from the terminating to the originating office in a retry attempt to complete call connections between the calling and called stations. These arrangements facilitate conformity with established call charging and billing equipment operations and rapid call set-up.

The callback arrangement advantageously functions with a CCIS (Common Channel Interoffice Signaling) system which interconnects the first and second call processors for improved information signaling. This CCIS system is essentially a data link signaling system which is separate from the trunking facilities which carry interoffice voice communication between the calling and called stations. It provides for the communications of the aforementioned automatic callback information between the first and second processors for checking the called and calling station busy-idle states and for automatically reattempting a completion of call connections between those stations after they are found to be idle.

In accordance with the best mode for carrying out the invention, each of the first and second call processors comprises an individual call store for storing dynamic real-time call processing data. The call store includes a supervisory memory for storing busy-idle data for all stations in the office with which it is associated. it advantageously includes a register for storing callback information comprising a callback service requesting code dialed by a caller as a prefix to the dialed called station number or a callback code dialed following a receipt of a busy indicating tone. The register is equipped also to store the calling and called station identities, line busy recheck time delay data, and data for a time limit on the callback service. The callback register is served by its processor at recurrent intervals and the latter decrements the line busy recheck time delay data until the delay period expires. Upon that event, the processor examines the supervisory memory to ascertain the busy-idle status of the called or calling station which it is serving.

If it is busy, the processor reenters data into the callback register for another line busy recheck time delay period. A maximum number of such reentries are effected under control of the time limit data. The processor periodically decrements the latter data to reduce the time remaining for callback service. When the time limit expires, the processor erases all data from the callback register and the callback service for that call is terminated.

When the called station is found to be idle in the supervisory memory of the call terminating office, the second call processor causes the called station line to be scanned to assure that it is not off-hook, or busy, on a newly originated call. If that line is busy, the supervisory memory for that station is updated and the processor reenters data into the callback register for another line recheck time delay period provided that the time limit has not expired.

After the called station is found to be idle and on-hook, the second processor is arranged to return callback information to the first processor over the CCIS facilities for enabling it to initiate a call retry from the originating office. Such an arrangement facilitates the use of originating office call charging and billing for that call to the calling party. For more rapid call set-up, this invention is also arranged so that the second processor bypasses the information return to the first processor and immediately utilizes the callback information to initiate a call from the terminating to originating office in a reattempt to complete call connections between the calling and called stations. In the latter arrangement, charging and billing for the terminating office call to the calling station is administered by the terminating office and accounting center facilities. When the terminating to originating office call retry cannot be completed due to a busy condition, the second processor sends the callback information from its callback register over the CCIS system to the first processor.

Upon receipt of the callback information, the first processor reads its supervisory memory to determine the busy-idle status of the calling station and, if idle, causes its station line to be scanned to determine the presence thereon of an off or on-hook signal. If an off-hook is present, the calling station is busy and the callback connections are not then attempted. The first processor proceeds to enter line recheck time delay data and time limit data in the callback register of the first office to allow time for the calling line to become idle.

After the calling station is found to be idle and on-hook, the first processor causes the calling station to be distinctively rung to alert the calling party to the callback service. The first processor is selectively arranged to extract the called number from its callback register and to forward it to announcement equipment which converts the number into an audible announcement message for transmission to the calling station following an answer of the ringing. The message reports that the call to the called station is now being reattempted. The announcement feature is useful where retry service is concurrently being furnished on a plurality of calls from the same calling station and enables each call retry to be uniquely identified. After the message has been delivered, call connections are extended from the calling toward the called station. The latter is then rung and ringback tone is supplied to the calling station. Upon called party answer, call conversation connections are cut-through.

Figure 1:
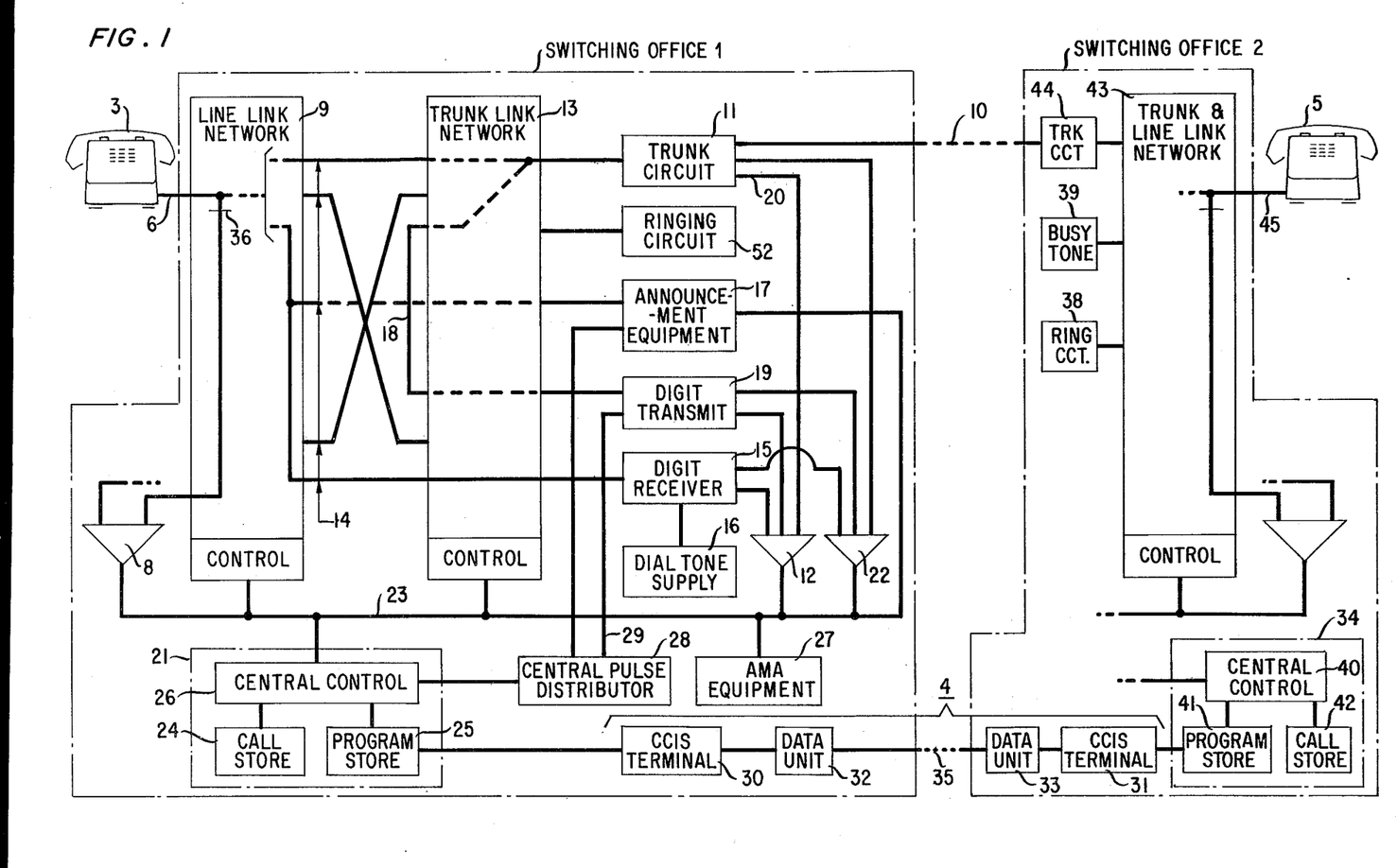
FIG. 1 shows, in block diagram form, exemplary electronic switching offices utilizing CCIS equipment.
Figure 2:
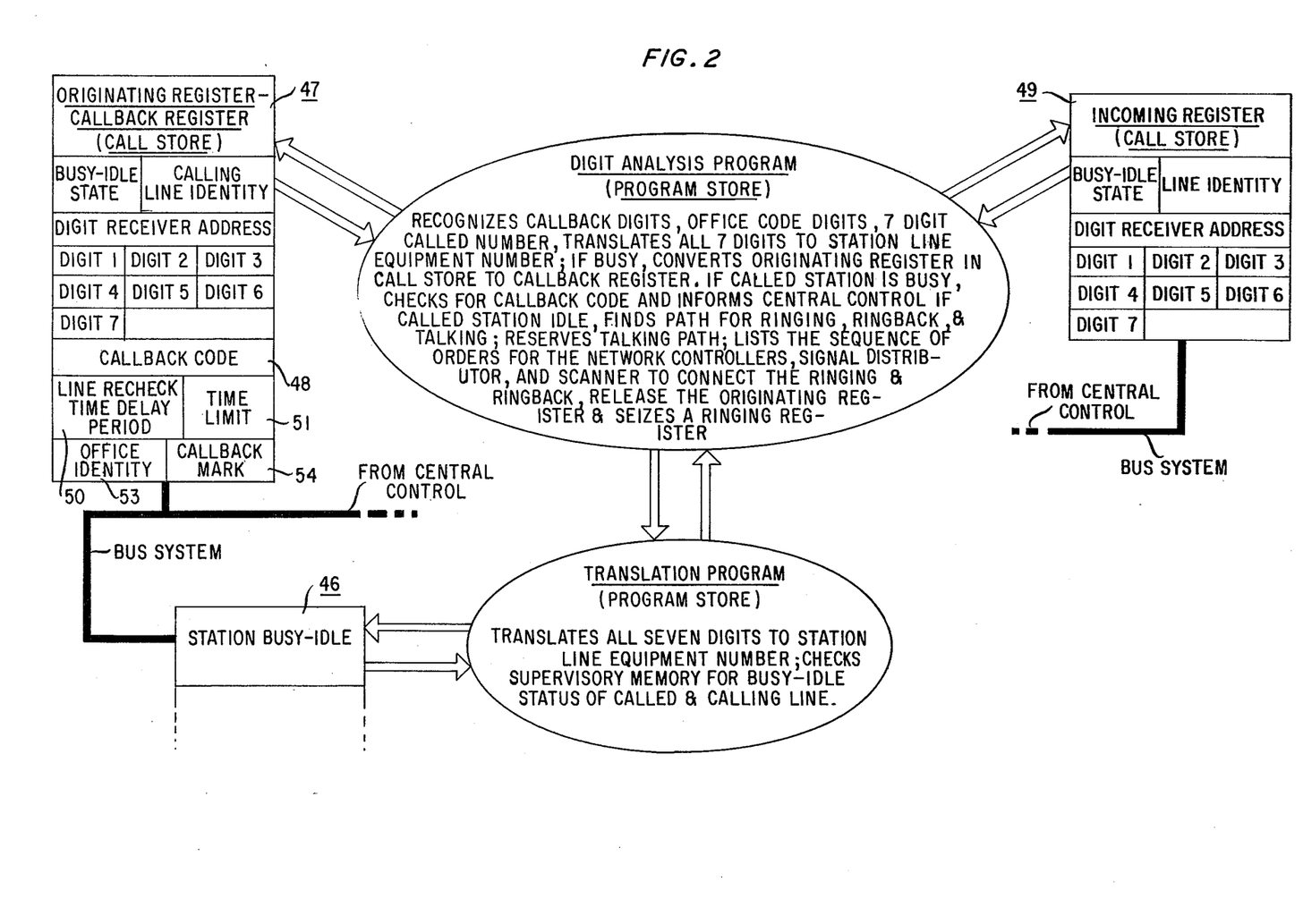
FIG. 2 illustrates call processor equipment including call store structure comprising an originating register-callback register together with central control structure used for automatic callback service.

The structure of FIG. 2 is provided in the call processor 21 (FIG. 1) of the switching office 1. It is separately duplicated for the call processor 34 (FIG. 1) of the switching office 2. Duplicates of FIG. 2 for offices 1 and 2 are not presented in the drawing for conciseness and simplifying the drawing. The following specification identifies the association of FIG. 2 structure with its appropriate call processor 21 or 34.

The principles of this invention are disclosed as incorporated, by way of example, in an electronically program controlled telephone switching system of the type disclosed in the Bell System Technical Journal (BSTJ), September 1964, Volume XLIII, Number 5, Parts 1 and 2; and in the R. W. Downing-H. F. May-F. F. Taylor-W. Ulrich U.S. Pat. No. 3,570,008 of Mar. 9, 1971. The latter disclosures and the patents referred to therein may be consulted for an understanding of the construction and operation of the scanners 8 and 12, pulse distributor 28, digit receiver 15 and transmitter 19, trunk circuit 11 and central processors 21 and 34. While certain of the circuit details of the line link and trunk link networks 9, 13 and 43 are set forth in the aforementioned disclosures, more definite specifications of these networks are presented in the following: T. N. Lowry U.S. Pat. No. 3,231,679 of Jan. 25, 1966; A. Feiner U.S. Pat. No. 3,257,513 of June 21, 1966; and K. S. Dunlap-A. Feiner-R. W. Ketchledge-H. F. May U.S. Pat. No. 3,281,539 of Oct. 25, 1966. Trunk circuitry is described in R. C. Casterline-L. F. Goeller, Jr.-J. M. Nervik U.S. Pat. No. 3,336,442 of Aug. 15, 1967.

Best Mode For Carrying Out the Invention

Switching offices 1 and 2 of FIG. 1 form a communication switching system and are illustratively both electronic program controlled switching offices of the Downing et al. configuration and are designed to serve many types of telephone calls including interoffice calls. An interoffice call is originated from a local customer station, for example, station 3 of a call originating office 1, and is terminated via another telephone office, such as terminating office 2 to a called customer station, such as station 5.

Station 3 is connected to the originating office 1 over telephone line 6 and is terminated in both a line scanner 8 and a line link network 9. Scanner 8 is employed for sensing "on-hook" and "off-hook" signals representing calling requests for service and supervisory idle-busy signals on line 6.

Office 1 is connected to office 2 via trunk 10 and a trunk circuit 11 which are, in turn, connected to both the scanner 12 and the trunk line network 13. The scanner 12 is employed for sensing "on-hook" and "off-hook" signals representing switching commands, supervisory busy-idle conditions, and calling requests for service.

Network 9 comprises switching facilities for establishing, under program control, communication connections from line 6 to a trunk line network 13 via network wire junctors 14. Similarly, network 13 includes switching facilities for establishing program controlled communication connections from the junctors 14 to digit receivers and dial tone supplies, such as receiver 15 and supply 16, as well as trunk circuits, such as circuit 11, which are used for serving outgoing calls to office 2. In addition, network 13 provides connections from announcement equipment 17 to a calling telephone line via network 9. Network 13 also provides outpulsing connections from an outgoing trunk circuit 11 via wire junctors 18 to the digit transmitter 19. These connections are used for outpulsing digit information needed by an office 2 to complete interoffice call connections. Network 13 furnishes connections under program control between any of the system trunk circuits, announcement equipment and data receivers or transmitters.

The trunk circuits, digit receivers and announcement equipment are provided with a plurality of scan points, such as point 20 of trunk circuit 11 to which are applied the appropriate on/off-hook and digit signals. These scan points are connected to the scanner 12, which senses the applied signals for subsequent use by a central processor 21.

A vast majority of the logic, control, storage, supervision and translation functions required for the operation of the trunk circuits, digit receivers and other circuits of offices 1 and 2 are performed by common control equipment comprising the central processors 21 and 34. Resultingly, a minimal amount of control circuitry is needed in the individual trunk circuits and receivers and only essential transmission apparatus and switching devices are included therein. The latter devices are connected to a signal distributor 22. This distributor acts as a buffer between the high speed central processor 21 and the relatively slow speed switching devices to provide for their operation whereby the circuits are switched into different functional states required for serving calls. Distributor 22 causes the operation and subsequent release of the switching devices upon receipt of programmed instructions from the central processor 21.

Communications between the signal distributor 22, scanners 8 and 12, and processor 21 are by way of bus systems and multiconductor cables which provide discrete communication paths between selected ones of the circuits. These bus systems and cables are represented herein by the bus systems and cables 23.

Processor 21 is a centralized data processing facility which is employed to implement the varied telephone service, administrative and maintenance functions of the switching system. It is divided functionally into three units comprising a call store 24, program store 25 and a central control 26. The call store 24 is a temporary or erasable memory facility which employs apparatus for storing information pertaining to call services. Such information includes: (1) the busy-idle status of stations and communication paths through the line and trunk link networks 9 and 13, (2) the digits received from a digit receiver 15, (3) the digits required to be outpulsed by a transmitter 19 for completing a call, (4) information required to interfacing with the CCIS equipment, and (5) the charging information to be recorded by automatic message accounting equipment 27 for billing purposes.

As shown in FIG. 2, an individual supervisory memory 46 is included in each of the call stores 24 and 42 for storing the busy-idle status information for telephone stations served by that call store. Each of the call stores 24 and 42 is also equipped with an individual call originating register for storing digits dialed by a calling station. Such digits illustratively comprise a 7-digit called station directory number and a callback code, for example a two digit code. Register 47 is also equipped to store a register busy-idle state mark, a calling station line identity, such as the line equipment number, an address of the digit receiver, if any, with which it is associated on a call, a line recheck time delay period count, and a time limit count for callback service.

The program store 25 is a semipermanent memory arrangement which is employed to store the less changing system information including the system programs and a variety of translation information, such as the directory number-to-line equipment location data. Translation facilities are also furnished in the program store 25 for deriving semipermanent information for routing via the CCIS equipment as well as for charging, ringing, and the like on telephone calls.

Central control 26 is a primary call processing unit of the system. It performs call processing in cooperation with the call store and program store and is capable of executing one at a time many different types of basic instructions, or orders, required for controlling the line and trunk link networks, trunk circuits, announcement equipment and digit receiver during calls. These instructions are written in the form of programs which are stored in the program store 25. The programming instructions are the vocabulary of the machine and are used to inform the switching circuits of the system how and when to perform their various functions. The central control 26 requests an instruction from the program store 25 every few microseconds and upon receipt executes, or commands, the appropriate circuit or circuits to carry out the appropriate functions. Accordingly, the central control 26 is the hub of the system which originates all addresses and commands to other circuits and receives back all answers from the controlled circuits. It is important to note, however, that the central control 26 is capable only of executing individual instructions and that the mechanized intelligence required to supply the instructions needed for the complex telephone functions of the system resides entirely in the stored program.

Central pulse distributor 28 is utilized to provide the central control 26 with fast access to many control points of the functional switching circuits of the office. Upon receiving an order from the central control, distributor 28 selects and applies pulses to one of several hundreds of control points. For example, the distributor 28 is selectively arranged to supply periodically recurring pulses over the lead 29 to the transmitter 19 for outpulsing information via the trunk circuit 11 to the office 2 while call connections are being established for a call.

The CCIS equipment 4 including terminal circuitry 30 and 31 and data transmission units 32 and 33 illustratively interface the central processors 21 and 34 of the switching offices 1 and 2. It provides for (1) data transmission and reception over a voice frequency link 35, (2) processing and translation of telephone data preprocessed by the central processors 21 and 34, and (3) interface signaling between processors 21 and 34.

Office 2 basically comprises the same elemental components as office 1. Consequently, only those parts of office 2 which are necessary for the understanding of the invention are shown in the drawing and operationally described in the following paragraphs.

Call Origination

Turning now to the manner in which an interoffice call is processed, it is assumed that a customer at station 3 originates an interoffice call to station 5.

When the caller removes the telephone handset from its cradle to originate the call, an off-hook signal is sensed in the scanner 8 as set forth in the Downing et al. U.S. Pat. No. 3,570,008. Subsequently, the central control 26 in executing a line scanning operation interrogates the scanner 8 and then consults the busy-idle information stored in the call store 24 to insure that the off-hook condition has not been previously observed. Upon ascertaining that the station 3 was previously on-hook, the central control 26 concludes that a call origination has occurred and it updates the busy-idle information for station 3 in call store 24. The central control 26 knows the scanner address of lines 3 and uses it to refer to a translation area of the program store 25 which provides it with all of the service information it needs concerning line 3. Such information includes class-of-service data pertaining to whether the line is entitled to automatic callback service and whether the associated telephone transmits dial pulses or TOUCH-TONE® signals.

The central control 26 then selects an idle digit receiver 15 and the associated dial tone supply 16 for use on the call. Next, the control 26 ascertains the availability of an idle path from line 6 through the networks 9 and 13 to the receiver 15 by consulting the busy-idle information stored in the call store 24 for all paths through the link networks. Upon finding such a path, the control 26 sends orders to the networks 9 and 13 to establish the appropriate switching connections. Thereafter, the scanner 8 is disconnected from line 6 when the network 9 opens the cut-off contacts 36 and thereby avoids any transmission degradation over line 6 due to the scanner circuitry. The central control 26 then requests the signal distributor 22 to operate apparatus in the receiver 15 for causing dial tone to be sent to the calling line 6.

After dial tone has been extended to line 6, the central control 26 scans the receiver 15 and hence line 6 every few microseconds via scanner 12. This scanning operations is performed to check both for the early abandonment of the call and for dial or TOUCH-TONE pulses. An abandoned call is signified by a prolonged on-hook condition on line 6 and dial pulses signified by periodic on/off-hook conditions thereon. These conditions are sensed by scanner 12 and read-out by processor 21. Each time the central control scans the receiver 15 and the calling line, it compares the present scanner reading with the immediately preceding one which is recorded in the call store 24. Whenever a disagreement is found by a comparison and the calling telephone is found to be off-hook on the next scanning operation, the control 26 recognizes that a digit is being transmitted and adds one to the pulse count kept in an originating register-callback register 47 (FIG. 2) of the call store 24 for the call. A digit is deemed complete when the calling line is off-hook and no momentary on-hook changes have been detected for a predetermined interdigital period.

When the central control 26 recognizes a receipt of the first digit pulse transmitted from station 3, it causes the dial tone transmission to that station to be interrupted.

Callback Request Prior to Dialing Called Number

Office 1 is arranged to permit the calling party to request automatic callback service at the inception of the call before the called station directory number is dialed and before the busy-idle status of the called station is ascertained. To do so, the caller dials a distinctive callback service code as a prefix to the dialed called number. Thereafter, if busy tone is returned to the caller, the automatic callback service is activated immediately in response to a called station hang-up. The call retry is automatically initiated after a prescribed line recheck time delay period following the caller hang-up and under control of processor 21.

As each digit of the prefix callback code is received via the receiver 15 and scanner 12, the central control 26 effects its storage in a callback code memory 48 of register 47 (FIG. 2) for subsequent use, if needed, on the call.

Called Office Code Translation

After the called office code portion of the dialed called number has been received, the central control 26 effects a translation of that code with the cooperation of the call store 24 and program store 25 in order to obtain call routing, alternate routing and/or signaling information needed to complete the call to station 5. In addition, the central control 26 obtains information from the office code translation which indicates that a predetermined number of called station digits are to be received. The routing information directs the central control 26 to select an idle outgoing trunk circuit 11 for use on a call from station 3 to 5. It also informs the central control 26 that a digit transmitter 19 is needed for outpulsing the digits required to complete the call connections through office 2 to station 5. Thereafter, the central control 26 consults with the call store 24 to ascertain the busy-idle status of both transmitter 19 and communication paths therefrom to the trunk circuit 11. If they are found to be idle, the central control 26 commands the network 13 to interconnect the transmitter 19 and trunk circuit 11. Next, the control 26 reserves an available communication channel through networks 9 and 13 between the calling line 6 and trunk circuit 11. Afterwards, a seizure signal is sent over trunk 10 to office 2 and trunk continuity between the two offices is checked at transmitter 19 in a known manner. Following the check, office 2 sends a "wink" signal to office 1 as a signal to commence outpulsing.

After the called station digits have been received and stored in the originating register 47, transmitter 19 outpulses the required called station digits to office 2 for storage in an incoming register 49 (FIG. 2) of the call store 42. Connections between transmitter 19 and trunk circuit 11 and the digit receiver 15 are then released for serving other calls. The reserved connections from the calling line 6 through networks 9 and 13 to trunk circuit 11 are then cut-through.

Upon completion of the outpulsing, office 1 ordinarily releases the originating register 47 from the call. According to the present invention, it is retained on the call so that its stored contents can be used for callback service in the event that the called station is busy. The decision to retain register 47 on the call is made by the class-of-service of station 3 or the central control 26 detecting the presence of the prefix callback code stored in that register. If the called station 5 is not busy, the central control 26 releases register 47 following a receipt of a called party answer signal from office 2 in a known manner.

The call to station 5 is processed through office 2 in a manner as described in the Downing et al. U.S. Pat. No. 3,570,008, column 73, line 28 et seq. Briefly, the digits outpulsed from office 1 over trunk 10 are assembled with other call information in an incoming register 49 (FIG. 2) of call store 42 and are then used by the central control 40 to interrogate the supervisory memory 46 of call store 42 to ascertain the busy-idle status of station 5. If the station is found to be idle, the call processor 34 controls the connection of ringing circuit 38 to call connections so that ringback tone is supplied to station 3 and active ringing is supplied to the called station 5. Upon a called party answer, ringing circuit 38 is released, the answer signal is returned to office 1 and call connections between stations 3 and 5 are cut-through under control of processor 34. Processor 21 detects the received answer signal to effect the release of its call store originating register 47 and the activation of the AMA equipment 27 to commence charging for the call if required.

Called Station Busy—Prefixed Callback Code

On the other hand, when station 5 is found busy, the central control 40 connects a busy tone circuit 39 to trunk 44 via network 43 for returning a busy tone to the calling party in a known manner. Concurrently, the central control 40 transmits a busy message concerning the call on trunk 10 to office 1 via the CCIS terminal and data units 31, 33, 32 and 30. At office 1, this message is stored in the call store 24 and is used to distinguish a busy condition from a call-not-answered condition.

Upon hearing the busy tone, the caller causes the automatic callback service to become effective by simply hanging-up the receiver of station 3. Processor 21 thereupon releases connections from station 3 through networks 9 and 13 and trunk circuits 11 and 44 to effect the release of office 1 from the call and subsequently to enable office 2 to control the automatic call retry processing. Specifically, the central control 26 detects the hangup via scanner 12 and then consults the call store 24 to check whether it has stored the aforementioned busy message and automatic callback information including the callback code and the calling and called number data in an originating register-callback register 47 of store 24. If it had not, the call is routinely terminated. If the check shows the presence of callback information, control 26 in cooperation with register 47 formats and stores in the CCIS terminal 30 a CCIS callback message including the identity of office 1, calling station data, the called station directory number, callback code and mark, a line recheck time delay count and a callback time limit count. Thereafter, terminal 30 transmits the stored message to CCIS terminal 31 of office 2 via data units 32 and 33 and the common interoffice signaling channel 35. The received message is transferred by processor 34 from terminal 31 to an originating register-callback register 47 in call store 42. The office identity is stored in storage circuitry 53 and the callback mark in storage circuitry 54 of the callback register 47. The callback mark identifies register 47 as operating in its callback mode. Control 26 thereafter cooperates with the program store 25 to erase the callback information from the originating register 47 of store 24 and control over the automatic callback service is transferred to processor 34.

Callback Request After Called Station Found Busy

If the prefix callback code had not been dialed and station 3 desires automatic callback service after hearing the busy tone, the caller flashes the switchhook of phone 3. Control 26 detects the flash via scanner 12 during a scan operation and then consults the call store 24 to check the stored class-of-service information for station 3. Upon determining that station 3 is entitled to callback service and that the flash is valid, control 26 continues to retain the calling and called station identities in the originating register-callback register 47 of store 24 and then proceeds to effect a release of call connections from line 6 to trunk circuit 11. Next, control 26 with the aid of stores 24 and 25 locates an idle digit receiver 15 and connects it to line 6 via networks 9 and 13. Dial tone is then sent to the caller via receiver 15 and networks 13 and 9 as a signal to dial the callback code and then hangup. Control 26 detects the dialed code via scanner 12 and effects its storage in the originating register 47 of store 24 which is storing the calling and called station identities. Next, the dialed code is translated under control of the program store 25. Thereafter, control 26 formats a callback message including the calling station data, the called station directory number, callback code, time limit and line recheck time delay counts and then sends it via the CCIS facilities to processor 34. All circuits of office 1 are then released from the call and callback information in store 24 is erased. Automatic call retry is thereafter under control of processor 34.

Terminating Office Callback Control

Upon receiving the callback message for either the prefix or later dialed callback code, processor 34 effects its storage in an originating register-callback register 47 in call store 42. The central control 40 thereafter treats the callback register as in incoming call register. During conventional serving of calls in such registers, control 40 in executing a digit analysis program recognizes that the callback register has stored the complete called station directory number. Control 40 detects the callback code in the register and then proceeds to examine the line recheck time delay storage circuitry 50 in the same register. If the count in circuitry 50 is other than zero, control 40 appropriately decrements the count under control of the system clock and defers a check of the called station line. The count decrementing occurs at recurrent time periods such that, for example, a minute delay period is allowed before a recheck of the called line busy-idle condition. When the count is decremented to zero, control 40 proceeds under control of a translation program in store 41 to use the directory number of station 5 to produce a terminating line equipment number and then to examine the terminating line supervisory memory (FIG. 2) of store 42 to check if the called station 5 is busy. When station 5 is found to be busy, control 40 retains the contents of the callback register, jams a line recheck time delay count into that register and proceeds to serve other calls.

Each time the central control 40 decrements the line recheck count to zero under control of the system clock, it also decrements the time limit count in the storage circuitry 51 of callback register 47 of store 42. Illustratively, the time limit count is decremented to zero after thirty minutes and it indicates that callback service is to be terminated if station 5 is not found to be idle after the next reading of the supervisory memory 46 of store 42. Control 40 then cooperates with the program store 41 to erase the callback information from the callback register of store 42.

When the aforementioned check finds that the called station 5 has become idle, control 40 proceeds to mark the station busy in the supervisory memory 46 of store 42 and then to extract its line equipment location identity in a known manner. Control 40 next under control of the program store 41 makes a directed scan of line 45 to determine whether station 5 is busy or idle. If it is busy, control 40 retains the callback information in the callback register, jams a line recheck time delay count into that register and proceeds to serve other calls.

Terminating to Originating Office Callback

When the directed scan finds station 5 idle, the central control 40 in conjunction with a program in program store 41 is optionally arranged to utilize the information in the callback register 47 of store 42 for immediately initiating a call from office 2 to office 1 in a endeavor to establish call connections between stations 3 and 5. A high probability exists that such a call will be successfully completed because telephone stations are generally idle more often than they are busy and, moreover, station 3 is expecting the callback. Advantageously, this callback procedure reduces call set-up time versus transferring the callback information from processor 34 to processor 21 for making a call retry from the originating office 1 as later explained.

This call procedure, however, necessitates an originating office 1 conversion of the calling line equipment number to a calling directory number by program store 25 and central control 26 before it is withdrawn from the callback register 47 of store 24 and, CCIS message formatted, stored and transferred to the callback register 47 of store 42 as priorly explained. It also necessitates a conversion of the called station directory number into a line equipment number by program store 41 and central control 40. Consequently, for this type of call, the station 3 is treated as the "call station" and station 5 as the "calling station". The manner in which such a call is served is otherwise essentially the same as priorly described for the call from station 3 to station 5 from the point that call details, such as the completed call station directory number, is stored in originating register 47 of store 24. When both stations 3 and 5 are found idle, active ringing is supplied to line 6 via networks 9 and 13 by ringing circuit 52 and to line 45 via networks 43 by ringing circuit 38. The central control 40 recognizes the need for active ringing rather than ringback tone for station 5 by the fact that it is serving a callback register of store 42. If station 3 is busy, the call from office 2 to office 1 is not completed and the central control 40 in conjunction with stores 41 and 42, after a prescribed period, illustratively abandons the call and returns callback information to office 1.

Callback Information Retransferred to Originating Office

Information in callback register 47 of store 42 is returned by processor 34 via the CCIS facilities to processor 21 under two circumstances. The first is when the terminating to originating office call cannot be completed due to a busy condition of station 3. The second is when the processor 34 is programmed not to initiate the latter call and instead the callback arrangement is equipped to originate callbacks from the originating office 1.

The information return to office 1 is initiated when the aforementioned directed scan of line 45 determines that station 5 is on-hook and idle. Resultingly, the central control 40 in conjunction with the stores 41 and 42 formats a callback message and transmits it via the CCIS facilities to processor 21 for initiating another attempt to complete the call between stations 3 and 5. The transmitted message includes the identity of originating office 1, called station directory number, calling station identity, and an indication of the calling station idle condition.

Processor 21 stores the received message in an originating register 47 of store 24 and proceeds, in the execution of a translation program, to examine the supervisory memory 46 of store 24 to ascertain the busy-idle status of station 3. When it is found to be idle, control 26 makes a directed scan of line 6 via scanner 8 to verify the idle status of station 3. Next, the central control 26 in cooperation with stores 24 and 25 effects a connection of an available ringing circuit 52 to line 6 via networks 9 and 13 for alerting the called station to answer. Distinctive ringing is furnished to station 3 for alerting the answering party to the callback attempt.

Following an answer by a party at station 3, ringing is tripped and line 6 is disconnected from ringing circuit 52 and is connected via networks 9 and 13 to equipment 17 for receiving an announcement. Control 26 is selectively arranged to extract the called directory number from the originating register 47 of store 24 and to forward it via distributor 28 to equipment 17 for conversion into the callback announcement message, such as "Your call to the number NNX-XXXX (station 5) is now being attempted."

Upon completion of the announcement message or simply upon a calling station answer when the announcement feature is not provided, processor 21 controls networks 9 and 13 to effect a release of connections between station 5 and either the announcement equipment 17 or the ringing circuit 52 and to select an available interoffice trunk circuit 11 and trunk 10 to office 2. The remainder of the processing to complete call connections between stations 2 and 5 is essentially as described hereinbefore. The translation program places the information in a buffer memory so that it can be passed to the incoming register under control of the program store 41.

Processor 21 next proceeds under control of program store 25 and call store 24 to establish call connections from calling station 3 through networks 9 and 13, and the selected trunk circuit 11 and trunk 10 to office 2. Seizure and supervision are exchanged between trunk circuits in a conventional manner. Central control 40 in conjunction with stores 41 and 42 then proceed to effect a connection of ringing circuit 38 to called station 5 and trunk circuit 44 via the line and trunk link networks 43 for alerting the called station 5 to answer and the calling station 3 to the ringing.

After a party at station 5 answers, the ringing is tripped. Central control 40 detects the ringing and then proceeds to disconnect trunk circuit 44 and station 5 from the ringing circuit 38 of office 2 and to interconnect station 5 and circuit 44 via networks 43. Processor 34 then switches trunk circuit 44 into its talking state for call conversation.

What is claimed is:

1. An interoffice callback arrangement for use in a communication system having
   a first switching office for establishing call connections from a calling station,
   a second switching office for extending the connection from the first switching office to a called station,
   equipment for processing interoffice callback information between the first and second switching offices when the call connections from the calling station to the called station cannot currently be completed due to a called station busy condition and the equipment including
   circuitry for storing called station busy-idle data and
   characterized in that the equipment comprises apparatus responsive to the processed callback information for examining the storing circuitry to determine that the called station is idle before automatically initiating a callback attempt to complete interoffice call connections between the calling station and the called station through the first and second switching offices,
   the equipment signal processes the interoffice callback information over a data link signaling system independent of the interoffice call connections between the first and second switching offices,
   apparatus is responsive to a determination that the called station is idle for controlling a transmission of the callback information from the second switching office over said signaling system to the first switching office and
   the equipment further comprises
   circuitry in the first switching office responsive to a receipt of said callback information from said signaling system for automatically retrying a completion of interoffice call connections from the calling station through the first and second switching offices to the called station.

2. An interoffice callback arrangement for use in a communication system having
   a call originating office for establishing call connections from a calling station,
   a call terminating office for extending the connections from the originating office to a called station,
   equipment for processing interoffice callback information between the originating and terminating offices when the call connections from the calling station to the called station cannot currently be completed due to a called station busy condition, and
   the equipment comprises
   a call processor in the originating office responsive to a receipt of a callback request for transferring the callback information from the originating office to the terminating office and
   a call processor in the terminating office responsive to a receipt of the transferred callback information for automatically determining that the callback station is idle before automatically initiating a callback attempt to complete interoffice call connections between the calling station and the called station through the originating and terminating offices, and
   characterized in that
   equipment signal processes the transfer of the callback information from the call processor of said originating office to the call processor of said terminating office over a data link signaling system independent of the interoffice call connections between the originating and terminating offices,
   the transferred callback information comprises a calling line equipment number and a called station directory number and
   the call processor of said terminating office comprises apparatus responsive to a determination that the called station is idle for controlling a retransfer of the calling line equipment number and the called station directory number from said terminating office over said data link signaling system to said orginating office and
   the call processor of said originating office comprises circuitry responsive to a receipt of the retransferred line equipment number and directory number for automatically retrying a completion of interoffice call connections from the calling station through said originating and terminating office to the called station.

3. An interoffice callback arrangement for use in a communication switching system having
   a first switching office for establishing call connections from a calling station,
   a second switching office for extending the call connections from the first switching office to a called station,
   call store apparatus including
   register circuitry for storing callback information including calling and called station data when the call connections from the calling station cannot currently be completed to the called station due to a busy condition and
   a memory for storing station busy-idle data,
   call processing equipment responsive to said information stored in the register circuitry for automatically reattempting the completion of said cell connections between the calling and called stations, and
   the call processing equipment comprising a first call processor in the first switching office and a second call processor in the second switching office,
   characterized in that
   the second call processor is responsive to the stored callback information for reading the memory to determine when the called station becomes idle and
   the first and second call processors are responsive to a determination that the called station is idle and to the stored callback information in the register circuitry for automatically reattempting the completion of call connections from the calling station through the first and second switching offices to the called station.

4. An interoffice callback arrangement of claim 3 characterized in that
   a common channel interoffice signaling system (4) interconnects the first and second call processors (26, 40) for callback information signaling independent of interoffice call connections used for communication between the calling and called stations (3, 5) and
   the first and second call processors (26, 40) communicate the callback information over the signaling system (4) for automatically reattempting the completion of call connections between the calling and called stations (3, 5) in response to the determination that the called station (5) is idle.

5. An interoffice callback arrangement of claim 4 characterized in that the first call processor (26) cooperates with the common channel interoffice signaling system (4) for sending to the second call processor (40) the callback information including the calling and called station data and a callback code dialed from the calling station and the call store apparatus (42) comprises in the second office (2) a callback register (47) for storing the calling and called station data and callback code received by the first call processor (26).

6. An interoffice callback arrangement of claim 5 characterized in that the callback register (47) stores the callback code dialed as a prefix to a called station identifying number dialed from the calling station (3) immediately following an origination of the call therefrom and communicated from the first to said second call processor (26, 40) over the common channel interoffice signaling system (4).

7. An interoffice callback arrangement of claim 5 in which the communication switching system comprises apparatus (39) for transmitting to the calling station (3) a signal indicating a called station busy condition, and characterized in that the callback register (47) stores the callback code dialed from the calling station (3) following the transmission of the busy condition indicating signal.

8. An interoffice callback arrangement of claim 5 characterized in that the second call processor (40) stores data in the callback register (47) indicating a time delay period for callback and alters the stored time delay period data at recurrent intervals until the time delay period expires, and the second call processor (40) is controlled by said callback register (47) for interrogating said memory (46) upon an expiration of the time delay period to determine when the called station (5) becomes idle.

9. An interoffice callback arrangement of claim 8 characterized in that the second processor (40) responsive to an expiration of the time delay period and a determination that the called station (5) is busy for controlling a reentry storage of data in the callback register (47) indicating the time delay period for callback.

10. An interoffice callback arrangement of claim 9 characterized in that the second processor (46) controls a successive number of said reentry storages of the time delay period data in the callback register (47) when the memory interrogating successively indicates that the called station (5) remains busy and is responsive to a prescribed number of successive reentry storages of said time delay period data in the callback register (47) for erasing the callback information from the callback register (47).

11. An interoffice callback arrangement of claim 8 characterized in that the second call processor (40) effects a transmission of the callback information from the callback register (47) over the common channel interoffice signaling system (4) to the first call processor (26) in response to data from said memory (46) indicating that the called station (5) is idle, a supervisory memory in said first switching office (1) for storing busy-idle data for said calling station, and the first call processor (26) is responsive to a receipt of said callback information from the common channel interoffice signaling means (4) for examining said supervisory memory to determine the busy-idle status of the calling station (3).

12. An interoffice callback arrangement of claim 11 in which said first switching office (1) comprises apparatus (8) operable for scanning the calling station line (6) to check the on/off-hook status of the calling station (3), and characterized in that the first call processor (26) is responsive to the supervisory memory examining indicating that the calling station is idle for operating the scanning apparatus (8) for ascertaining that the calling station is on-hook before reattempting the completion of the callback connections between the calling and called stations (3, 5).

13. An interoffice callback arrangement of claim 12 in which the first switching office (1) comprises a circuit operable for alerting the calling station (3), characterized in that the first call processor (26) is responsive to the ascertaining that the calling station (3) is on-hook and idle for effecting an operation of the alerting circuit to alert the calling station (3) to an automatic callback attempt to the called station (5).

14. An interoffice callback arrangement of claim 13 characterized in that the alerting circuit is operative under control of the first call processor (26) for supplying a distinctive audible callback alerting signal to the calling station (3).

15. An interoffice callback arrangement of claim 13 characterized in that the alerting circuit comprises circuitry (52) for ringing the calling station (3) and equipment (17) responsive to the calling station (3) answering the ringing for supplying a callback announcement message to the calling station (3).

16. A callback arrangement for use in a communication switching system having a network for establishing call connections with a calling station, a register for storing callback information including calling and called station data when call connections cannot currently be completed from said calling station to a called station due to a busy condition, and a call processor responsive to the information stored in the register for automatically cooperating with the network to reattempt the completion of the cell connections, characterized in that common channel interoffice signaling equipment is effective following a receipt of called station busy signals from another communication switching system for cooperating with the call processor to transmit the callback information stored in said register to the other communication switching system, and said call processor is responsive to a return of callback information from the other communication switching system via said equipment upon a determination that the called station is idle for automatically cooperating with said establishing means to reattempt said completion of said call connections.

17. A callback arrangement of claim 16 characterized in that
said register comprises a callback register (47) for storing the calling and called station data and a callback code dialed from the calling station (3).

18. A callback arrangement of claim 16 characterized in that
the callback register (47) comprises apparatus (48) for storing the callback code dialed as a prefix to a called station identifying number dialed from the calling station (3) immediately following an origination of the call therefrom.

19. A callback arrangement of claim 16 characterized in that
the callback register (47) includes apparatus (48) for storing the callback code dialed from the calling station (3) following a transmission of a called station busy signal to the calling station (3).

20. A callback arrangement for use in a communication switching system having
a network for extending a call connection to a called station,
a memory for storing busy-idle data for the called station,
a register for storing callback information including calling and called station data when call connection cannot currently be completed to the called station due to a busy condition, and
a call processor responsive to the information stored in the register for automatically reading the memory and reattempting the completion of the call connection,
characterized in that
the call processor reads the memory in response to the callback information stored in the register to determine when the called station (5) is idle, and
a common channel interoffice signaling system cooperates with the call processor and another communication switching system and is responsive to a determination that the called station is idle for communicating the callback information from the register and call processor to said other switching system.

21. A callback arrangement of claim 20 characterized in that
the register (47) comprises a callback register operable for storing the callback information, and
the call processor (34) is responsive to a receipt of said callback information including calling and called station data and a callback code from the common channel interoffice signaling system (4) for operating the callback register to effect a storage of the received callback information therein.

22. A callback arrangement of claim 21 characterized in that
the call processor (34) controls a storage of data in said callback register indicating a time delay period for checking the busy-idle state of the called station (5),
alters the stored time delay period data at recurrent intervals until the delay period expires and interrogates the memory (46) upon an expiration of the time delay period to determine when the called station (5) becomes idle.

23. A callback arrangement of claim 22 characterized in that
the call processor (34) is responsive to an expiration of the time delay period and a determination that the called station (5) is busy for controlling a reentry storage of the time delay period data in the callback register (47).

24. A callback arrangement of claim 23 characterized in that
the call processor (34) controls a successive number of the reentry storages of the time delay period data in the callback register (47) when the interrogating successively indicates that the called station (5) remains busy and is responsive to a prescribed number of successive reentry storages of the time delay period data in said callback register (47) for erasing the callback information from the callback register (47).

* * * * *